Feb. 27, 1934.   A. W. BECKER   1,949,098
WINDSHIELD CLEARING DEVICE
Filed Feb. 6, 1928
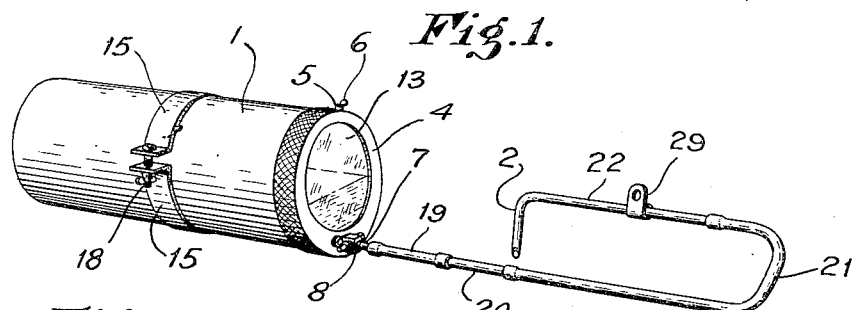
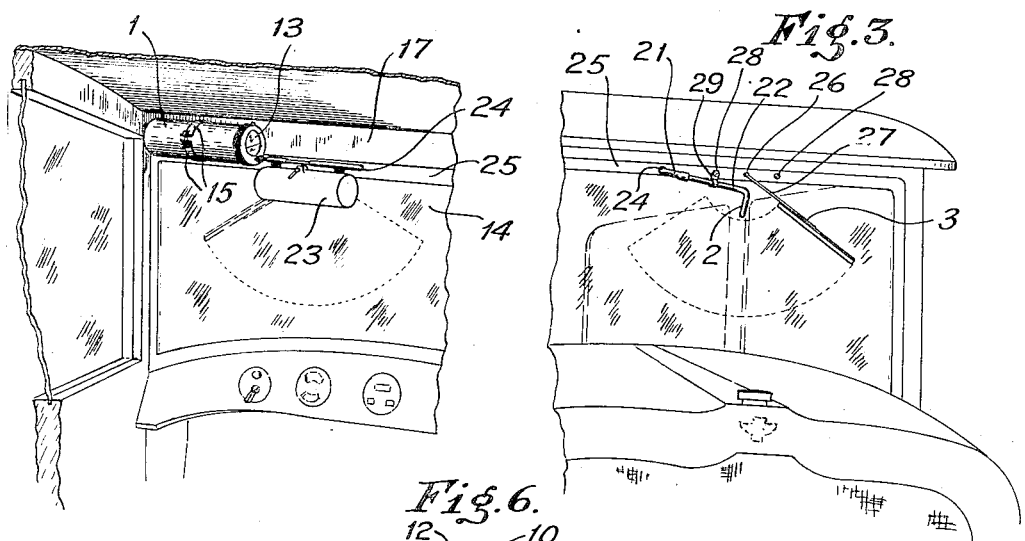
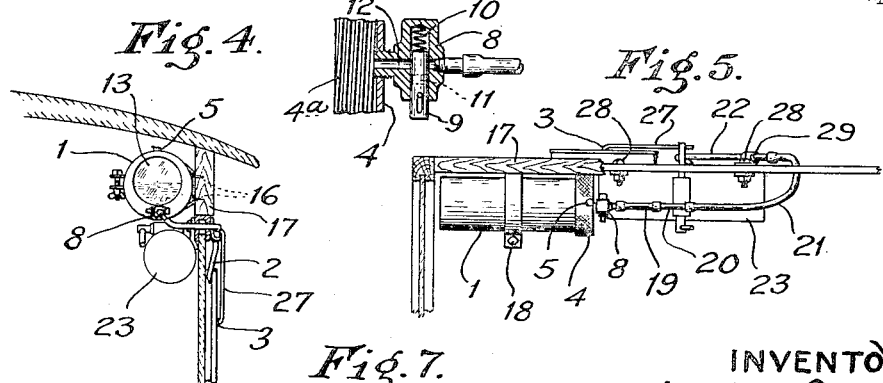
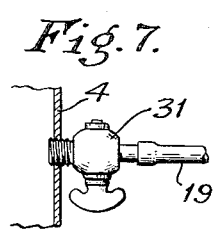
INVENTOR
ALBERT W. BECKER
BY
ATTORNEY Patented Feb. 27, 1934

1,949,098

UNITED STATES PATENT OFFICE 1,949,098

WINDSHIELD CLEARING DEVICE

Albert W. Becker, Hartford, Conn.

Application February 6, 1928. Serial No. 252,350

30 Claims. (Cl. 15—250)

My invention relates to windshield clearing devices.

It has for its object to provide improved means for keeping a windshield clear of frost, ice, mist, rain, dust, dirt, or the like tending to obstruct the vision. A further object of my invention is to provide improved means having provision for delivering whenever desired a quantity of suitable windshield clearing liquid on the windshield in the path of the wiper in such manner as to enable the latter to spread the liquid in an improved manner and keep the windshield clear in an improved and effective manner. Other objects of my invention are to provide an improved and simplified liquid supply means which is adapted to cooperate with a standard wiper as set forth, which requires no connection to the wiper although co-operating with the same and the windshield, which in no way obscures the vision of the driver, and which is also adapted to be provided at small expense and to be readily and quickly disposed in or removed from operative relation to a windshield and wiper whenever desired. A still further object of my invention is to provide improved liquid supply means having controlling means readily accessible to and conveniently actuated by the operator whenever desired, and also provided with improved stationary liquid delivery means outside of the windshield adapted to supply a quantity of suitable non-freezing or other windshield clearing fluid onto the outside surface of the windshield and in the path of the wiper in such manner as to enable the latter to keep the windshield clear even under the most adverse weather or other conditions. These and other objects and advantages of my improved construction will, however, hereinafter more fully appear.

In the accompanying drawing, I have shown one embodiment which my invention may assume in practice, illustrating the same as applied to an automobile, although it will be understood that this embodiment is used only for illustrative purposes and that the invention may be used with equal facility on the windshields of airplanes or other conveyances, or in fact wherever a windshield is utilized.

In the drawing,—

Figure 1 is a perspective view of my improved reservoir and its connections per se, the supply connection being swung up to facilitate illustration;

Fig. 2 is a perspective view showing the inside of an automobile with the same attached thereto in a preferred position;

Fig. 3 is a similar view showing the connections visible from the front of the machine;

Fig. 4 is a vertical sectional view through the windshield;

Fig. 5 is a horizontal sectional view, a part of the frame above the windshield being broken away to facilitate illustration;

Fig. 6 is a detail view of the valve mechanism, and

Fig. 7 shows a modified form of valve.

In this illustrative construction I have illustrated my invention as including a reservoir 1 adapted to be disposed within and above a windshield and equipped with a suitable supply line leading therefrom and terminating in a suitable pipe 2 adapted, while disposed outside the path of a wiper and free from movement with the latter, to deliver onto the outside of the windshield and in the path of a usual automatically operated wiper 3 a suitable localized supply of the nonfreezing or other windshield clearing chemical or liquid carried in the reservoir so that the chemical or liquid may be spread by the wiper as hereinafter set forth.

Considering the reservoir 1 more particularly, it will be evident that it may comprise any suitable receptacle, cylinder or drum so constructed and disposed as to be adapted to receive and distribute a supply of clearing liquid to the windshield. Herein it comprises a non-transparent horizontal cylinder of uniform diameter having a closed outer end and closed sides, and carrying on its opposite or inner end a removable cover 4 adapted to be connected thereto by any suitable means, as, for example, by threading 4a (Fig. 6). Herein, this cover 4 is of an improved construction and has all the special construction concentrated thereon. As shown, it is provided at its top with an air vent 5 and the latter has a usual pivoted cap 6 adapted to close the vent whenever desired. The cover 4 herein is also provided at its bottom with a liquid outlet 7 so disposed and located that, when the vent is open, the reservoir may be substantially drained while remaining in its horizontal position illustrated. Preferably, this cover 4 also carries a valve generally indicated at 8. This valve 8 may be of various different forms, but preferably is of a type adapted to be quickly operated. In Fig. 6 it is of a reciprocating push button type, comprising a transversely disposed spring pressed plunger 9 normally held in projected valve closing position by a spring 10 and having an opening 11 therein adapted, when the plunger is pushed in, to register with a corresponding passageway 12 in the outlet 7. Moreover, it will be noted that the cover 4 is herein also provided with a transparent portion or sight glass 13 enabling one to determine at a glance the amount of liquid in the reservoir, the location of the glass in the inner end of the cover 4 and between the vent 5 and the outlet 7, making it especially convenient while also enabling the vent and outlet to function effectively.

This container 1 is preferably mounted inside the windshield to be kept clear, herein indicated at 14, in such manner that the valve 8 is readily accessible to the operator. Also, while its location may be varied, it will be noted that herein the container 1 is suitably supported above and at the left of the windshield wiper. Various supporting means may be used, but herein I have shown straps 15 suitably attached between their ends, as by screws 16, to the body frame 17 above the windshield and enclosing the container 1 and having their free ends removably connected by quick releasable or detachable means, such, for example, as a bolt and wing nut connection 18 conveninently accessible from inside the car. Thus it is made possible to hold the container securely in the desired position while still permitting quick release or removal of the same whenever desired. For example, when it is desired to fill the container 1 or substitute another therefor, the wing nut connection 18 may be loosened and the container drawn out longitudinally, the concentration of the various special features on the cover at one end of the cylinder and the consequent possibility of providing a reservoir of uniform diameter, making such a withdrawal very convenient. It will of course also be evident that if desired, instead of having the clamps 15 fastened to the framework 17, the same may be connected to the top of the windshield itself, as for example in an open vehicle.

Operatively connected to the outlet 7 of the container 1, is a pipe connection leading to the tube 2. While this connection may obviously assume various forms, herein it is flexible and sectional to facilitate connection and disconnection. As illustrated, it includes a short flexible or rubber section 19 fitted over the end of the outlet 7, a cooperating short metal pipe section 20 fitted into the opposite end of the rubber section, and also a longer flexible or rubber pipe section 21 connected to the pipe 20 and to one end of an elongated rigid delivery or drip pipe 22 preferably having the tube 2 bent laterally at the end thereof and the tube 2 cut off at an angle, as indicated. In the construction shown, the pipe sections 19, 20 and 21 extend horizontally from the outlet 7 inside the windshield and over and beyond the inside operating mechanism of the windshield wiper, herein including the usual cylinder 23. At the right of the latter, the flexible or rubber section 21 is passed through a suitable aperture in the top of the car, herein in the form of a perforation 24 in the usual strip or rim 25 above the windshield, and is then directed reversely, i. e. to the left, and slightly downwardly on the outside of the glass, as shown in Fig. 3, while the metal pipe section 22, which fits into the end thereof, extends farther in the same direction. Herein it will also be noted that the angularly extending portion 2 on the end of the pipe section 22 is disposed beneath the axis 26 of the windshield wiper 3 and downwardly and inwardly close to the outer surface of the glass and inside the path of movement of the arm 27 of the wiper, i. e. so that it does not in any way interfere with the movement of the wiper, while the cut mouth of the tube is also so shaped and disposed adjacent the glass as to deliver effectively onto the outer surface of the glass. Herein it will also be noted that one of the screws 28 serving to attach the wiper to the windshield also carries a clip 29 through which the rigid pipe 22, rather than the flexible connection 21, extends, thereby providing a simple and sturdy non-collapsible connection in which this wiper screw not only attaches the wiper but acts with the clip as a supporting and securing means for the delivery member 22.

Thus it will be observed that when the container 1 is filled with a suitable windshield clearing liquid, or a chemical, such, for example, as one adapted to prevent the formation of frost or ice and to soften frost or ice already on the windshield, it is possible for this liquid to cooperate very effectively with the wiper 3. More particularly, when the container is mounted as shown in Fig. 2 and connected with the pipe connections 19, 20, 21 and 22, the valve plunger 9 is readily accessible to the operator whenever needed, while the stationary pipe 2 is so disposed closely adjacent the top of the path of the wiper 3 that, whenever liquid is released by the valve 8, the pipe 2 will deliver a localized supply of this liquid so that it will flow by gravity down the outside of the windshield into the path of the wiper, herein midway between the ends of that path, and be spread by the wiper as the latter moves back and forth. Thus, the valve plunger 9 being normally held in closed position by its spring, whenever the operator finds that the windshield is being obscured, it is only necessary for him to reach up and punch in the valve plunger 9 in order to release the desired amount of the liquid to clear the windshield in cooperation with the wiper. This arrangement is very convenient for the operator, the valve 8 being equally as convenient for the operator as the usual control member of the windshield wiper.

More particularly considering the spreading operation, it will be observed that when a supply of liquid is released on to the windshield, herein above the path of the wiper and substantially midway between the ends of that path, the wiper in its next lateral movement past the pipe 2 will spread all the fluid in its path over the area between the pipe 2 and the end of its path toward which this wiper is then traveling. Further, in passing the pipe 2 when going in the opposite direction, it will similarly spread the supply of liquid subsequently issuing from the pipe 2 and which by then has flowed down to adjacent the bottom of the wiper path, but spread this supply over the other half of the wiper path. Thus, the load on the wiper is minimized and through the localizing and controlling of the liquid supply and the co-ordination of it with the wiper movements, the wiper is enabled to operate effectually, while the liquid is economically distributed in a film of the most effective character without waste. It will also be observed that due to the delivery of the liquid upon the windshield not only is a given amount of the liquid distributed most effectively, as above brought out, but loss of the liquid by seepage, blowing, spraying or throwing, is minimized. The delivery of the liquid upon the windshield also eliminates all need for objectionable supply connections to the wiper. Further, the engagement with the glass of the liquid, tends to slow up the downward movement of the liquid, as compared with the speed of liquid dropping without such engagement, and in such manner as to facilitate co-ordination of the flow with the wiper by reducing the chance of the liquid passing below the path of the wiper before being acted upon by the latter. Through my improved structure wherein the supply is localized and the flow over the windshield may be co-ordinated with the wiper movement, it will also be observed that soiling of the car is minimized, it being possible with my improved construction to confine the fluid to an area approximating that of the path of the wiper. Further, it will be noted that in my construction, even during the few moments that the liquid is flowing, only a narrow stream of colorless liquid flows from the top toward the bottom of the path of the wiper and is then immediately spread, so that there is no interference with the vision.

Attention is also directed to the fact that, due to the glass 13, the operator is enabled to ascertain at all times the amount of liquid in the container 1. Also, through the use of the releasable connection 18 and the separable pipe connections 19 etc., it is also possible to release 18 and pull off 19 and then bodily withdraw the container 1 readily and quickly whenever refilling is desired. If, on the other hand, it is then desired to substitute another container, this may also be very conveniently done, it only being necessary to unscrew the cover 4 on the removed container, thread it on the new container in place of the cover thereon, and insert and attach the new container. The air vent 5 and the gravity flow connections also insure flow under all conditions. It will also be observed that if it is desired at any time, as between winter seasons, to remove the parts, this may be readily accomplished simply by releasing the screws 18, 16 and 28 and disconnecting the pipe connections, all parts thus being readily removable for storage until their further use is required. Ordinarily, however, the mechanism is so small and inconspicuously disposed as to make its removal unnecessary, the average operator preferring to leave the same on the car as a permanent part of the equipment thereof. Further, the device is usable at any time of the year in connection with mist or rain, certain clearing fluids tending to prevent the formation of mist and also shedding rain in such manner as to leave the vision clear. Also the liquid supply will soften and enable the removal by the wiper of ice, sleet, dust, dirt, and the refuse from insects or the like, which otherwise might either remain upon the windshield and obscure the vision, or require the operator to stop the car and manually wipe the windshield clear. It will, of course, be evident that where desired, as for example, in summer use in connection with the removal of dust, dirt, or insect refuse, water may be used in lieu of an anti-frost composition.

It will be evident that my invention is adapted to use in connection with various forms of windshield wipers whether of the hand operated type, of the ordinary exhaust connected or vacuum operated automatic type, or of the automatic electric type, and whether of the oscillating or reciprocating type; the reservoir and its stationary supply connection being such as to enable the same to be applied irrespective of the type of windshield wiper used, without conflict with the same. Attention is also directed to the fact that no special construction of the wiper is required, thereby enabling the advantages of standard wipers to be obtained, while avoiding special constructions and expense, and enabling the device to be applied to practically all cars. Further, my improved construction eliminates the need for any connection to the wiper movable therewith and tending to form a drag thereon or on its operating means interfering with its operation. My supply connections being stationary, there is also no tendency to wear out the pipe connection and thereby cause objectionable leakage over the windshield. While it is more convenient to have the reservoir inside the windshield and in the position indicated, it will also be evident that the reservoir may be differently located, and that instead of a gravity flow and air vent, a pressure or other feed may be used if desired, the air vent then being omitted. It will also be evident that the flow through the pipe or tube 2 may be retarded as desired, either to discharge a charge in one operation or to provide a drip tube effect, which ever is found most effective with the particular chemical or other liquid used.

It will also be noted that the device may be constructed and applied with facility either to new cars during building or to cars already in operation, the changes necessary to accommodate the mechanism being simple and of a type adapted to be readily and inexpensively made. Attention is also directed to the inexpensive construction of the device, which enables it to be produced very cheaply, and to the simplicity of the gravity flow connections, which insure effective operation thereof for long periods without the need of attention on the part of the operator. Should, however, the pipe connections become clogged for any reason, it will be noted that due to their sectional connection they may be taken down, cleaned, and reassembled with facility and despatch. This sectional construction including the flexible sections, is also very convenient when removing the reservoir for filling or when applying or removing the whole device.

It being evident that various different forms of valve 8 may be utilized, I have shown in Fig. 7 a modified form of valve comprising a usual rotatable valve 31, which may be used if desired, and which obviously can be set in any desired position to maintain either a drip or a flow of such an amount as is required by the conditions encountered.

While I have in this application specifically described the above forms which my invention may assume in practice, it will be understood that the invention is not limited thereto but may be modified and embodied in various other forms without departing from its spirit or the scope of the appended claims.

What I claim as new and desire to secure by Letters Patent is:—

1. In combination, a windshield, a windshield wiper thereon, and means including a supply line independent of the wiper for delivering a localized supply of clearing fluid on the windshield for flow thereon intersecting the path of the wiper and distribution by the latter.

2. In combination, a windshield, a windshield wiper on the outside thereof, and means including a supply line independent of the wiper for delivering a localized supply of clearing fluid on the windshield having a delivery end above the path of the wiper and spaced from the ends of said path.

3. In combination, a windshield, a windshield wiper on the outside thereof, a liquid reservoir, and a stationary supply line independent of the wiper leading from said reservoir and localizing and delivering a supply of clearing fluid on the outside of the windshield in the path of the wiper.

4. In combination, a windshield wiper operable on the outside of a windshield, a liquid reservoir, and a stationary supply line independent of the wiper and leading from said reservoir and delivering a localized supply of liquid on the outside of a windshield in the path of the wiper, said reservoir and supply line being so disposed as to permit gravity flow.

5. In combination, an automatic windshield wiper operable on the outside of a windshield, a liquid reservoir, a stationary supply line independent of the wiper and leading from said reservoir adapted to deliver a localized supply of liquid on the outside of a windshield and transversely of the path of the wiper, and means for at will effecting the delivery to the windshield of liquid from said reservoir through said supply line.

6. In combination, a windshield wiper operable on the outside of a windshield, a liquid reservoir, and a supply line leading from the latter having a stationary delivery end disposed outside the area wiped by the wiper and supplying a localized supply of liquid on the outside of a windshield in the path of the wiper.

7. In combination, a windshield wiper operable on the outside of a windshield and having a blade, a liquid reservoir, and a supply line leading from the latter and having a stationary delivery end disposed above the path of said blade and providing a flow of liquid on the outside of a windshield across the path of the blade.

8. In combination, a windshield, a windshield wiper on the outside thereof, a liquid reservoir, a supply line independent of the wiper and leading from the reservoir terminating short of the wiper, a stationary delivery end for said supply line delivering vertically on the outside of the windshield a localized supply of liquid moving over said windshield in the path of the wiper and spaced from the ends of said path, and means for at will effecting the delivery of liquid from said reservoir through said supply line and delivery end onto said windshield.

9. In combination, a windshield, a windshield wiper on the outside thereof, a liquid reservoir disposed above the windshield and having an air vent, a supply line independent of the wiper and leading from the reservoir, and a stationary delivery end for said supply line terminating short of the wiper above the latter and below said reservoir and when said vent is open delivering by gravity on the outside of the windshield a localized supply of liquid moving on said windshield above the path of the wiper substantially midway between the ends of said path.

10. In combination, a windshield, a windshield wiper mechanism including a wiper on the outside of the windshield, means for fastening said wiper mechanism in position for operation on the windshield, a reservoir inside the windshield, and a supply line independent of the wiper leading from the reservoir to the outside of the windshield and delivering thereon a localized supply of liquid, said supply line being supported by said fastening means for said wiper mechanism.

11. A clearing fluid distributing device for windshields comprising a reservoir, means for supporting the same adjacent a windshield, a cover on said reservoir, a pipe line connected to said cover, stationary outlet means connected to said pipe line for delivering a localized supply of liquid from said pipe line on the windshield, and means for effecting flow through said outlet means.

12. A clearing fluid distributing device for windshields comprising a reservoir, means for supporting the same adjacent a windshield, a reservoir cover provided with an air vent, a pipe line connected to said cover and having an outlet means for delivering when said vent is open a localized supply of liquid on the windshield, and means for controlling the flow through said pipe line.

13. A clearing fluid distributing device for windshields comprising a reservoir, means for supporting the same, a cover for said reservoir, a pipe line connected to said cover, stationary outlet means connected to said pipe line adapted to deliver a localized supply of liquid on the windshield, and means carried by said cover for effecting flow through said outlet means.

14. A clearing fluid distributing device for windshields comprising a reservoir, means for supporting the same adjacent a windshield, a reservoir cover provided with an air vent, a pipe line connected to said cover and localizing the liquid supply from said reservoir and adapted to deliver on the windshield when said vent is open, and a valve carried by said cover and controlling the flow through said pipe line.

15. A clearing fluid distributing device for windshields comprising a reservoir, means for supporting said reservoir adjacent a windshield, a pipe line connected to said reservoir, a delivery tube connected to said pipe line and adapted to deliver on a windshield, means for supporting said tube in stationary delivering position adjacent a windshield wiper, and means for effecting flow through said tube.

16. A clearing fluid distributing device for windshields comprising a reservoir, means for mounting the same, a pipe line connected to said reservoir and terminating in a tube independent of a wiper, and means for fixing said terminal tube in a position adjacent a wiper to deliver clearing fluid from said reservoir on a windshield in the path of said wiper.

17. A clearing fluid distributing device for windshields comprising a reservoir, means for mounting the same, a flexible pipe line connected to said reservoir, a terminal tube provided with a body connected to said pipe line and a relatively laterally directed delivery portion independent of a wiper, and means for positioning said delivery portion adjacent a wiper when connected to said pipe line to deliver fluid from said reservoir on a windshield in the path of said wiper.

18. In combination, reservoir clamping means adapted to be attached to a support, a reservoir having a tubular body releasably disposed in said clamping means and also having a removable cover carried on said body outside said clamping means, control valve means carried by said cover, and a supply line connected to said cover and controlled by said valve to control flow from said reservoir.

19. In combination, reservoir clamping means adapted to be attached to a support, a reservoir releasably disposed in said clamping means and having a removable cover and air vent and control valve means, said cover, air vent, and control valve being so disposed relative to said clamping means as to permit longitudinal withdrawal of said reservoir upon loosening of said clamping means, and a supply line connected to said reservoir and controlled by said valve to control flow from said reservoir when said vent is open.

20. In combination, reservoir clamping means adapted to be attached to a support and having means adapted to permit lateral or longitudinal withdrawal of a reservoir therein, a reservoir having a tubular body releasably disposed in said clamping means and removable longitudinally or laterally upon release of said clamping means, a removable cover carried on one end of said reservoir and carrying air vent and control valve means, and a supply line connected to said cover and controlled by said valve to control flow from said reservoir when said vent is open.

21. In a clearing fluid distributing device for windshields, a reservoir cover carrying a peripheral air vent and a fluid controlling valve, and also having both said vent and valve provided with communications with the inside of said cover for draining a horizontal reservoir carrying said cover while said cover is disposed in vertical position, and means for removably attaching said cover to a reservoir.

22. In a clearing fluid distributing device for windshields, a reservoir cover carrying a sight glass and a peripheral air vent and having, when said cover is in vertical position, an outlet below said vent and communicating with the inside of said cover on the opposite side of said sight glass from said vent, and means for removably attaching said cover to a reservoir.

23. In combination, a windshield, a source of liquid supply, and a fluid distributing tube connected to the latter and having outside said windshield a stationary terminal portion having an angularly cut off extremity thereon and said extremity positioned adjacent said windshield surface whereby liquid delivered through said tube is directed onto said windshield.

24. In combination, an oscillating wiper adapted to operate on the outside of a windshield, a reservoir, and a stationary liquid supply line connected thereto and disposed out of the path of the wiper and adapted to deliver on the outside of the windshield in the path of the wiping surface of the wiper and between the ends of the path thereof.

25. In combination, an oscillating wiper having a pivot and adapted to operate on the outside of a windshield, a reservoir, a stationary supply line connected thereto and terminating short of the wiper, and stationary delivery means connected to said supply line and delivering on the outside of the windshield, said stationary delivery means being disposed above the wiping surface of the wiper and delivering in the path of the latter.

26. In combination, an oscillating wiper having a pivot and adapted to operate on the outside of a windshield, a reservoir, and a stationary supply line connected thereto and terminating short of the wiper and adapted to deliver on the outside of the windshield above the wiping surface of the wiper and substantially midway between the ends of the path thereof, said supply line including a tube having a delivery end beneath the wiper pivot.

27. In combination, a windshield, a wiper on the outside thereof, a reservoir inside the windshield, and a valved supply line independent of the wiper connected to said reservoir and extending in one direction relative to the windshield inside the latter and to the outside of the same and reversely relative to said first mentioned direction and terminating in a supply tube above the wiper and independent thereof and delivering on the windshield a localized liquid supply in the path of the wiper.

28. In combination, a windshield, a wiper on the outside thereof movable back and forth in a prescribed path thereon, reservoir attaching means, a reservoir carried by said attaching means, and means including a supply line independent of the wiper connected to the reservoir and a stationary delivery end terminating short of the wiping surface of the wiper for delivering on the windshield a localized supply of liquid above and substantially midway between the ends of the path of the wiper.

29. In combination, a windshield, reservoir attaching means, a reservoir disposed in said attaching means, a removable cover carried on a projecting end of said reservoir projecting laterally outside said attaching means, and a supply line suitably connected to said cover and delivering on the windshield a localized supply of liquid.

30. In combination, a windshield, releasable reservoir attaching means adjacent the top of the windshield, a reservoir longitudinally withdrawable therefrom upon release thereof, a removable cover carried by one end of said reservoir and disposed laterally outside said attaching means, air vent means and a valve carried by said cover, and a supply line suitably connected to said cover and delivering on the windshield when said vent means is open.

ALBERT W. BECKER.

Disclaimer 1,949,098.—*Albert W. Becker*, Hartford, Conn. WINDSHIELD CLEARING DEVICE. Patent dated Feb. 27, 1934. Disclaimer filed Apr. 11, 1950, by the assignee, *Trico Products Corporation*.

Hereby enters this disclaimer to claims 1, 3, 5, 6, 16, 17, and 24 in said specification.
[*Official Gazette May 9, 1950.*]